(12) United States Patent
Tseng et al.

(10) Patent No.: US 10,974,367 B2
(45) Date of Patent: Apr. 13, 2021

(54) GRIP JAW STRUCTURE (71) Applicant: TOYO AUTOMATION CO., LTD., Tainan (TW)

(72) Inventors: Kun Cheng Tseng, Tainan (TW); Kuei Tun Teng, Tainan (TW); Hsiang Wei Chen, Tainan (TW)

(73) Assignee: TOYO AUTOMATION CO., LTD., Tainan (TW)

( * ) Notice: Subject to any disclaimer, the term of this patent is extended or adjusted under 35 U.S.C. 154(b) by 0 days.

(21) Appl. No.: 16/551,811

(22) Filed: Aug. 27, 2019

(65) Prior Publication Data
US 2020/0353597 A1    Nov. 12, 2020

(30) Foreign Application Priority Data

May 10, 2019 (TW) ................. 10811625.4

(51) Int. Cl.
| B25J 15/00 | (2006.01) |
| B25B 5/02 | (2006.01) |
| B25B 5/08 | (2006.01) |
| B25J 15/02 | (2006.01) |
| B25J 19/00 | (2006.01) |

(52) U.S. Cl.
CPC ................. B25B 5/02 (2013.01); B25B 5/08 (2013.01); B25J 15/028 (2013.01); B25J 19/0062 (2013.01)

(58) Field of Classification Search
CPC .... B25J 15/0253; B25J 15/028; B25J 15/026; B25J 19/0062; B25B 5/02; B25B 5/08
See application file for complete search history.

(56) References Cited

U.S. PATENT DOCUMENTS

| 4,762,357 | A | * | 8/1988 | Bergamo | ............... B25J 15/028 |
| | | | | | 294/119.1 |
| 4,765,669 | A | * | 8/1988 | Meier | .................... B25J 13/082 |
| | | | | | 294/106 |
| 4,768,821 | A | * | 9/1988 | Hucul | ...................... B25J 9/148 |
| | | | | | 294/119.1 |
| 4,955,653 | A | * | 9/1990 | Beals | .................. B25J 15/0273 |
| | | | | | 294/119.1 |
| 5,125,709 | A | * | 6/1992 | Meier, Jr. | ............... B25J 15/103 |
| | | | | | 294/119.1 |
| 6,331,758 | B1 | * | 12/2001 | Takanashi | .............. B25J 15/028 |
| | | | | | 318/560 |
| 10,099,384 | B1 | * | 10/2018 | Kesil | .................... B25J 15/0028 |
| 2016/0278872 | A1 | * | 9/2016 | Gombert | ................ A61B 34/72 |

* cited by examiner

Primary Examiner — Dean J Kramer
(74) Attorney, Agent, or Firm — Bacon & Thomas, PLLC (57) ABSTRACT The present disclosure relates to a grip jaw structure with characteristics as follows: a cam disk is driven by a rotary motor; two transmission shafts are driven through two slotted guideways in the cam disk; lubricants inside the slotted guideways adhere to a plurality of bearings in which the transmission shafts in the slotted guideways are inserted when the transmission shafts are shifted; sliders between which a workpiece is clamped are driven to be shifted by the transmission shafts along linear rails at the top of the framework for stresses sustained and dispersed by bearings.

9 Claims, 10 Drawing Sheets

GRIP JAW STRUCTURE

BACKGROUND OF THE INVENTION

1) Field of the Invention

The present disclosure relates to a small-sized gripper device, particularly a grip jaw structure in which a lubricant container is integrated with the Archimedean spiral for less space required and a plurality of rails are added for higher allowable stresses of a grip jaw structure clamping a workpiece.

2) Description of the Prior Art

A device with which a workpiece to be machined mechanically is fixed properly for manufacturing and/or inspections is also known as a gripper; in a broad sense, a device with which a workpiece in any manufacturing process is fastened fast, easily and safely is regarded as a gripper. However, a gripper to which driving force based on electric power or a pneumatic pump is supplied exerts strong force that may damage an object to be clamped or weaken stability of a small-sized workpiece clamped by the gripper. Accordingly, how to design a gripper clamping an object by forces changed stably and moderately and kept strong enough is an issue to be faced by persons skilled in the arts.

The patent documentations with respect to grippers are shown as follows:

A drive mechanism and a gripper mechanism equipped with the drive mechanism are disclosed in China patent CN101439479A. As shown in CN101439479A, an electrical gripper includes a drive mechanism, a feed screw and a gripper section wherein the drive mechanism is equipped with a motor, the feed screw transmits a rotary drive force from the motor to a feed nut which is shifted in an axial direction, and the gripper section is able to grip a workpiece by coupling to the feed nut and being shifted thereby; the drive mechanism is constituted by a self-locking mechanism which prevents the feed nut from being retracted as a result of a reactive force received in the process that the feed nut goes forward and the workpiece is gripped by the gripper section.

As disclosed in China patent CN202571360U, a hydraulic quick automatic centering chuck for processing machinery such as machine tool comprises a clamping jaw component with three or four clamping jaws, a chuck body, a connector in the chuck body and a ball screw hydraulic transmission mechanism. The ball screw hydraulic transmission mechanism comprises a multi-head ball screw component, a hydraulic oil cylinder and a hydraulic converter wherein the multi-head ball screw component consists of a multi-head screw as well as a ball nut and the hydraulic converter is connected with a hydraulic system. The multi-head ball screw component and the hydraulic oil cylinder are installed in a spindle hole of a machine tool; the hydraulic converter communicates with the hydraulic oil cylinder. The hydraulic oil cylinder into which hydraulic oil entering the hydraulic converter is fed is moved back and forth such that the ball nut is driven to be moved back and forth and the multi-head ball screw component is rotated forwards or backwards. With the multi-head ball screw component stretching into the chuck body and linking the connector, the connector is enabled to drive the clamping jaw to be shifted axially based on an Archimedean spiral disc cartridge.

However, a small-sized gripper with which a workpiece is clamped based on a single rail in the prior arts is criticized for poor stability. For better stability, a gripper on which a lubricant container is installed occupies more space and exerts intensive stresses on a workpiece. Accordingly, a grip jaw structure in the present disclosure is intended to settle the above problems.

SUMMARY OF THE INVENTION

In view of the above problems, a grip jaw structure provided in the present disclosure comprises two linear rails for better stability and carrying capacity of a grip jaw in which a workpiece is held.

A grip jaw structure provided in the present disclosure comprises slotted guideways which match a lubricant guideway for less space required than a separated structure and fewer lubricants to be added.

A grip jaw structure provided in the present disclosure further comprises a lubricant guideway which contributes to suppressing noise, that attributed to discrepancy of residual lubricants between slotted guideways after a long period of time.

A grip jaw structure provided in the present disclosure relies on a framework consisting of multiple collapsible members structurally such that stresses sustained by a transmission shaft are dispersed and transmitted from layer to layer and sliders between which a workpiece is clamped bears more stresses.

A grip jaw structure provided in the present disclosure relies on a slide block consisting of multiple collapsible members structurally for a stable occlusion of a grip jaw structure.

A grip jaw structure provided in the present disclosure relies on bearings coupled with transmission shafts to prevent the transmission shafts from contacting with slotted guideways directly to produce a friction.

To this end, a grip jaw structure is embodied according to the following technical measures. A grip jaw structure in the present disclosure has characteristics as follows: a cam disk, which is driven by a rotary motor fixed under a framework such that two transmission shafts inside two slotted guideways of the cam disk are shifted correspondingly and lubricants in the slotted guideways adhere to and circulate in a plurality of bearings in which the transmission shafts in the slotted guideways are inserted; two sliders, which are fixed on two slide blocks separately and driven to be shifted by the transmission shafts along two linear rails at the top of the framework such that the bearings sustain and disperse stresses with a workpiece clamped between the sliders.

A grip jaw structure is further embodied according to the following technical measures.

The grip jaw structure wherein said framework comprises an upper frame, a main frame and a lower frame.

The grip jaw structure wherein said cam disk comprises a lubricant guideway which communicates with said slotted guideways.

The grip jaw structure wherein said cam disk comprises lock holes in which two set screws are inserted such that a relative position between a transmission shaft of the motor and said cam disk is fixed.

The grip jaw structure wherein said transmission shaft has a thick portion which is shifted in a portion through hold of said upper frame regularly.

The grip jaw structure wherein said transmission shaft has a thin portion inserted in one of said bearings.

The grip jaw structure wherein said slide block comprises a load-carrying portion and two rail portions.

The grip jaw structures wherein said lubricant guideway through which lubricants inside slotted guideways communicate with each other for metal residues, held in lubricants uniformly prevents the transmission shafts from being worn unevenly and contributes to suppressing noise attributed to discrepancy of lubricants between slotted guideways.

The grip jaw structure wherein said slotted guideways in which lubricants are accommodated and both the transmission shafts and said bearings are immersed partially rely on said lubricant guideway for accommodations of lubricants inside said slotted guideway uniformly.

In contrast to the prior arts, a grip jaw structure in the present disclosure proves effective in: (1) less space is occupied by a grip jaw structure, which comprises slotted guideways matching a lubricant guideway, than a separated structure traditionally; (2) noise attributed to the residual lubricants by the residual volume to each slotted guideways after a long period of time is suppressed due to the design of a lubricant guideway; (3) stresses sustained by transmission shafts are transmitted and dispersed by collapsible components from layer to layer for higher allowable stresses on sliders between which a workpiece is clamped.

DETAILED DESCRIPTIONS OF THE PREFERRED EMBODIMENTS

A grip jaw structure is explained in the preferred embodiments for clear understanding of purposes, characteristics and effects of the present disclosure.

Figure 2:
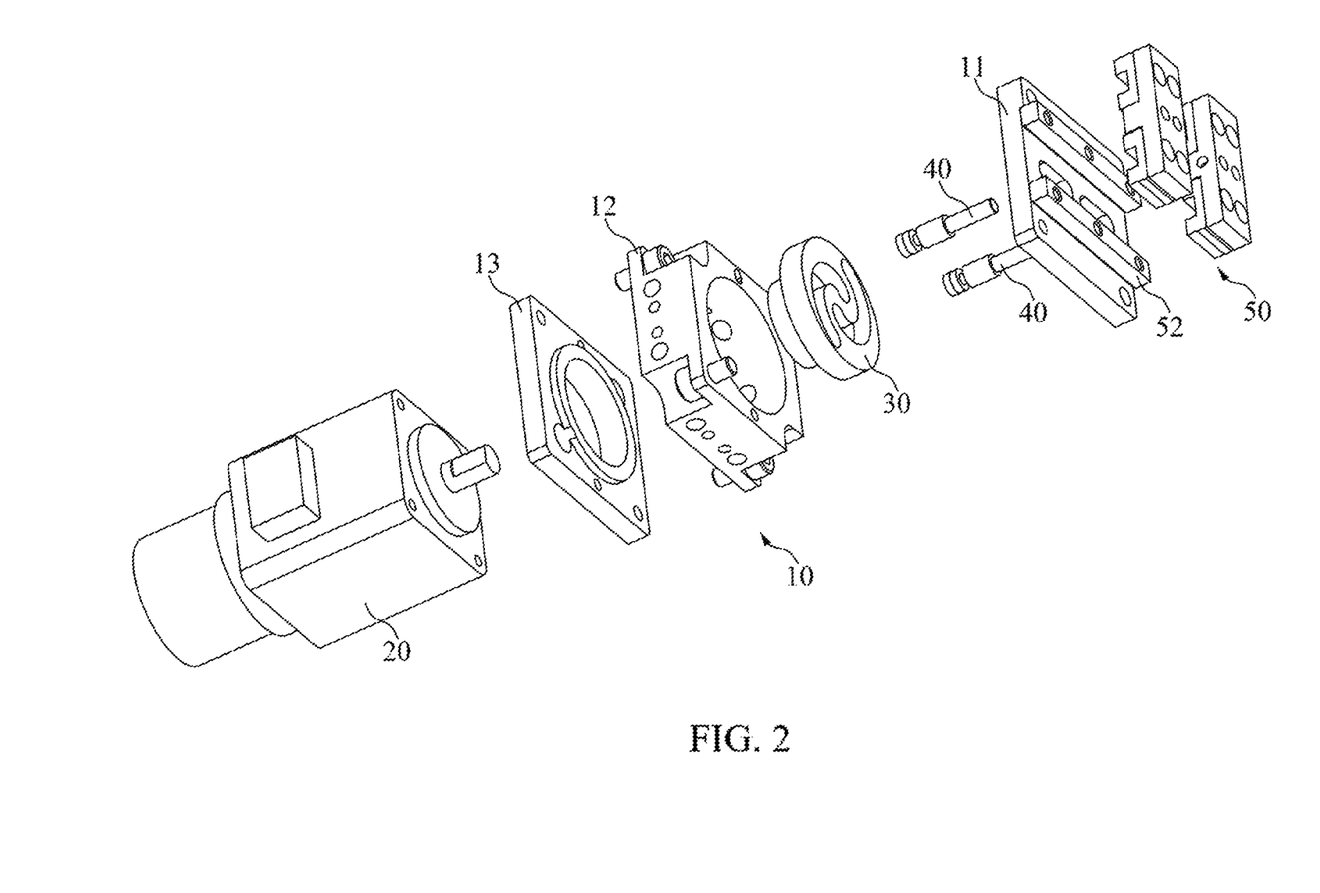
FIG. 2 is an exploded perspective view of a grip jaw structure in a preferred embodiment.

Referring to FIG. 2 for the first embodiment, which illustrates a grip jaw structure consisting of multiple parts and comprising a framework (10), a motor (20), a cam disk (30), two transmission shafts (40) and two slide blocks (50).

Figure 1:
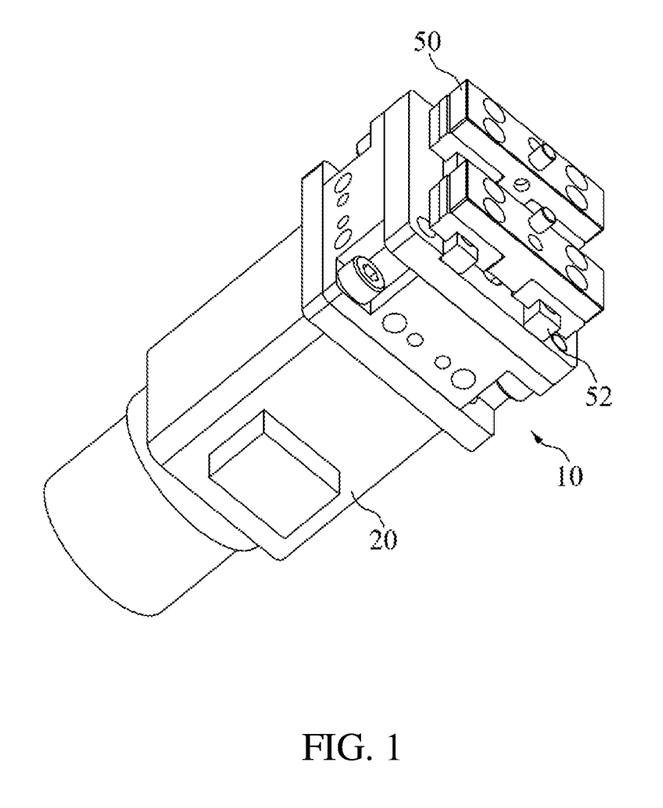
FIG. 1 is a schematic perspective view of a grip jaw structure in a preferred embodiment.

In a grip jaw structure, as shown in FIGS. 1 and 2, the framework (10) comprises laminar or block-shaped structures on which components are fixed and a plurality of holes and/or grooves for installations of components to assemble.

Figure 4A:
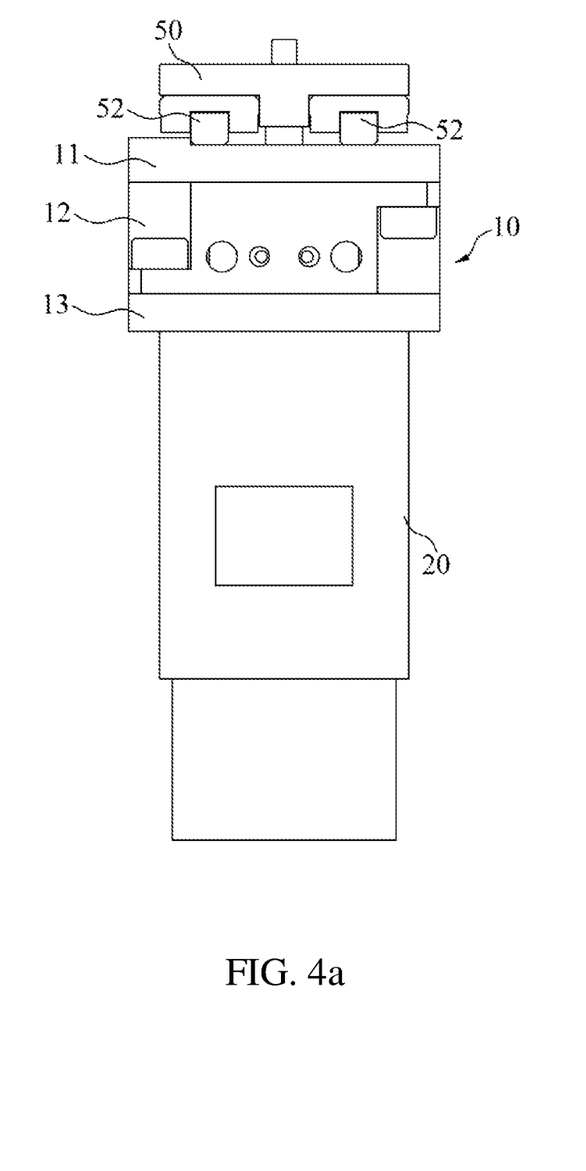
FIG. 4a is the second side view of a grip jaw structure in a preferred embodiment.
Figure 4B:
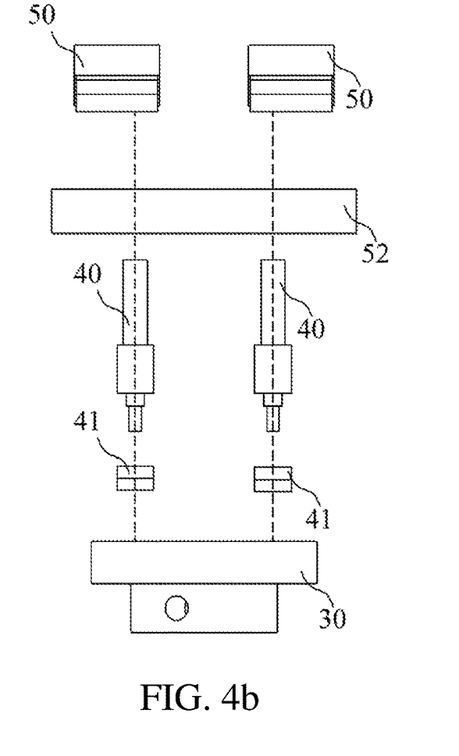
FIG. 4b is a partial exploded view of a grip jaw structure in a preferred embodiment.
Figure 4C:
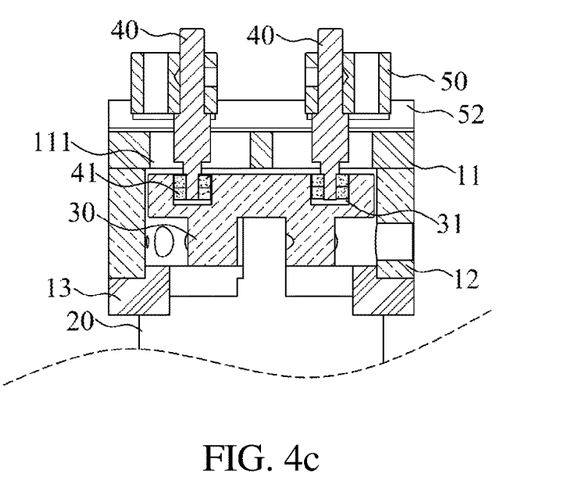
FIG. 4c is the first cross-sectional view of a grip jaw structure in a preferred embodiment.

Preferably, as shown in FIGS. 4a and 4c, the framework (10) comprises an upper frame (11), a main frame (12) and a lower frame (13), all of which are fixed and secured sequentially through a lock-up, welding or snap joint mechanism. In a grip jaw structure, the upper frame (11) used to fix two linear rails (52) thereon is opposite to the main frame (12) adequately (FIG. 4a). Moreover, the main frame (12) used to protect the cam disk (30) is opposite to the lower frame (13) adequately and has a hole in which the cam disk (30) is accommodated partially (FIG. 4c). Additionally, the lower frame (13) used to fix the motor (20) also has a hole in which both the motor (20) and the cam disk (30) are accommodated partially (FIG. 4c). As mentioned previously, the framework (10) divided into multiple parts structurally contributes to dispersing stresses sustained by the transmission shaft from layer to layer such that sliders between which a workpiece is clamped sustains more stresses.

In a grip jaw structure, the cam disk (30) is driven by a transmission shaft of the motor (20) clockwise or counterclockwise; in general, the motor (20) also known as an electric motor is an electric device transforming power energy to mechanical energy with which kinetic energy is generated for driving other facilities.

Figure 3A:
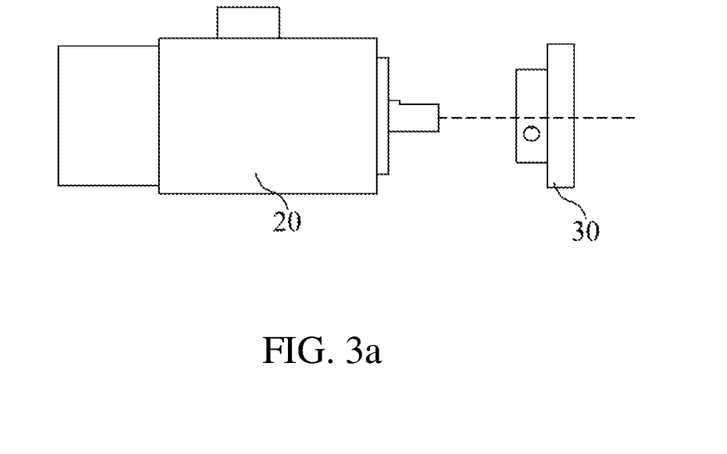
FIG. 3a is the first side view of a grip jaw structure in a preferred embodiment.
Figure 3B:
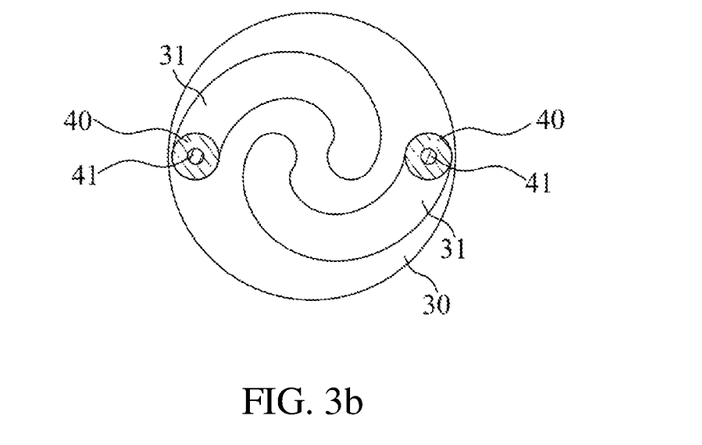
FIG. 3b is the first schematic view for slotted guideways of a grip jaw structure in a preferred embodiment.

In a grip jaw structure, the cam disk (30), which is a component transmitting rotations induced by the motor (20) (FIG. 3a), comprises two slotted guideways (31). As shown in FIG. 3b, the slotted guideway (31) based on the Archimedean spiral in design is a groove structure in which lubricants are accommodated for lubrication, low frictions inside the slotted guideway (31) and a longer service life and replaces a traditional design that is characteristic of a groove designed are accommodate for lubrication and a guideway, both of which are separated from each other and criticized for its large dimension structurally and barely satisfactory capacity for lubricants. Moreover, referring to FIG. 6b, which illustrates a relative position between the transmission shaft of the motor (20) and the cam disk (30) is fixed by two set screws (301) in lock holes on the cam disk (30).

In a grip jaw structure, the transmission shaft (40) which is a rotary linear structure is used to transmit dynamic forces, that is, rotary forces generated by the motor (20) are transmitted to the slide blocks (50) from the cam disk (30).

Figure 3C:
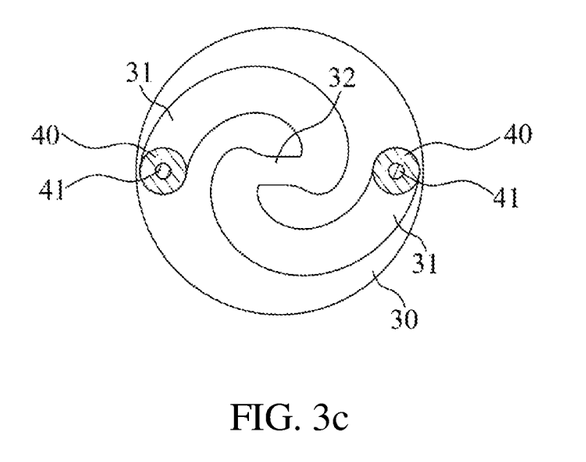
FIG. 3c is the second schematic view for slotted guideways of a grip jaw structure in a preferred embodiment.
Figure 3D:
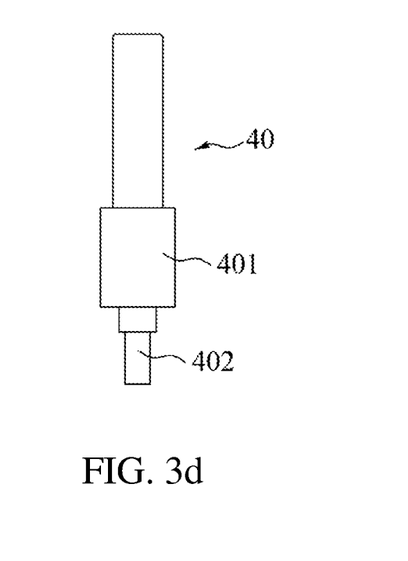
FIG. 3d is a side view for a transmission shaft of a grip jaw structure in a preferred embodiment.

Preferably, as shown in FIG. 3d, the transmission shaft (40) has a thick portion (401) and a thin portion (402): the thick portion (401) is consistently shifted in a portion through hold (111) in the upper frame (11) (FIG. 5b); the thin portion (402) is inserted into one of a plurality of bearings (41) (FIGS. 4b and 4c). Moreover, the bearing (41) also known as a component supporting a spindle or shaft parts for a linear movement is able to sustain a rotator or an object for a linear reciprocal motion mechanically, maintain a spindle at a central position and regulate a running mechanical component for reduced frictions between a transmission shaft (40) and a slotted guideway (31) when relative movements among components take place on a spindle (FIG. 4c); a transmission shaft (40) is inserted into and rivets a bearing (41) (not shown in figures).

Figure 5A:
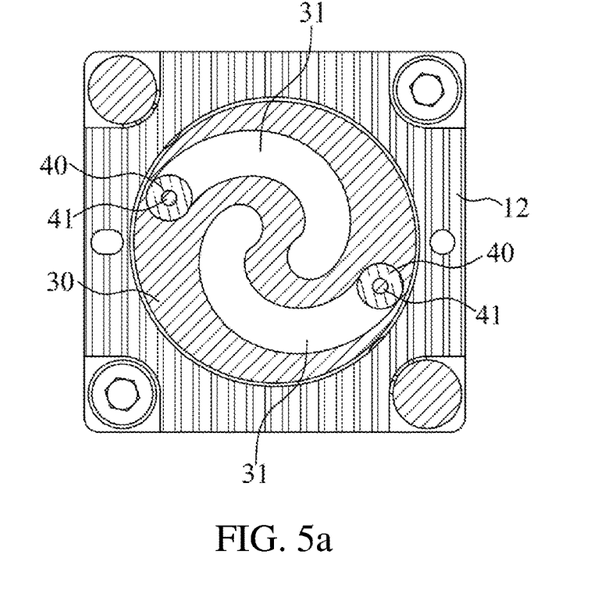
FIG. 5a is the second cross-sectional view of a grip jaw structure in a preferred embodiment.
Figure 5B:
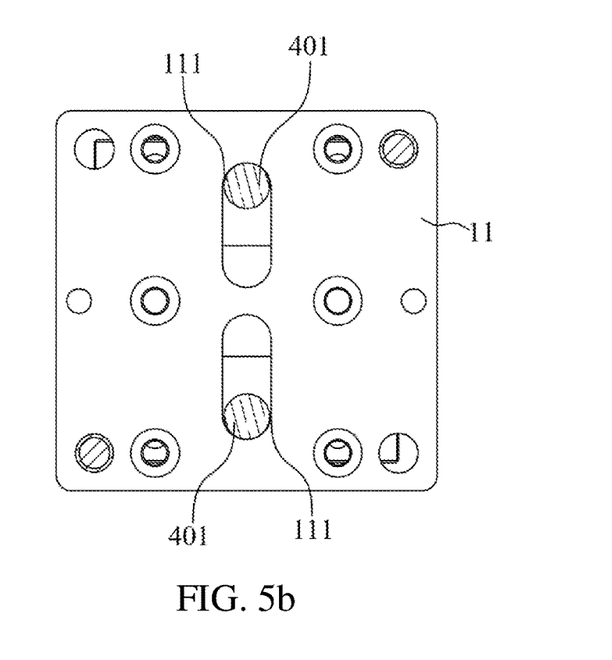
FIG. 5b is the third cross-sectional view of a grip jaw structure in a preferred embodiment.
Figure 5C:
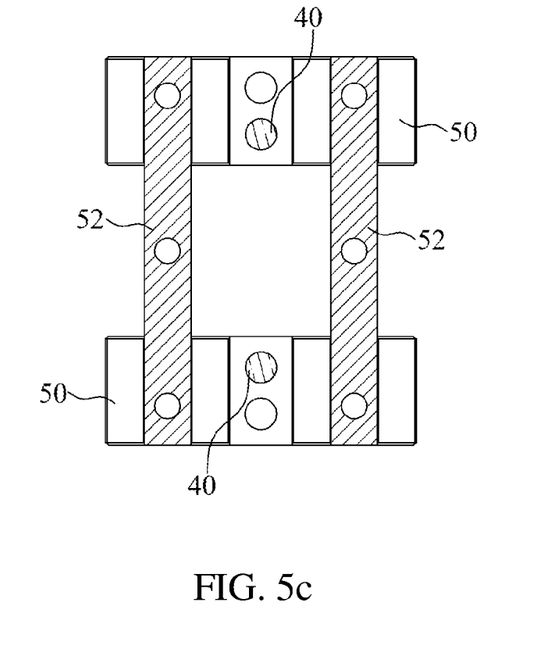
FIG. 5c is the fourth cross-sectional view of a grip jaw structure in a preferred embodiment.

In a grip jaw structure, as shown in FIG. 5c, a slide block (50) matches a linear rail (52): the slide block (50) is shifted on a rail; the linear rail (52) also known as a linear rail, a slide rail, a linear guide rail or a linear slide rail for a linear reciprocal movement sustains a certain torque and completes a high-precision linear motion which supports and navigates a moving component in a predetermined direction back and forth in the case of high loading. In the present disclosure, a grip jaw structure comprises two linear rails for better stability, load capacity and strength.

Figure 6A:
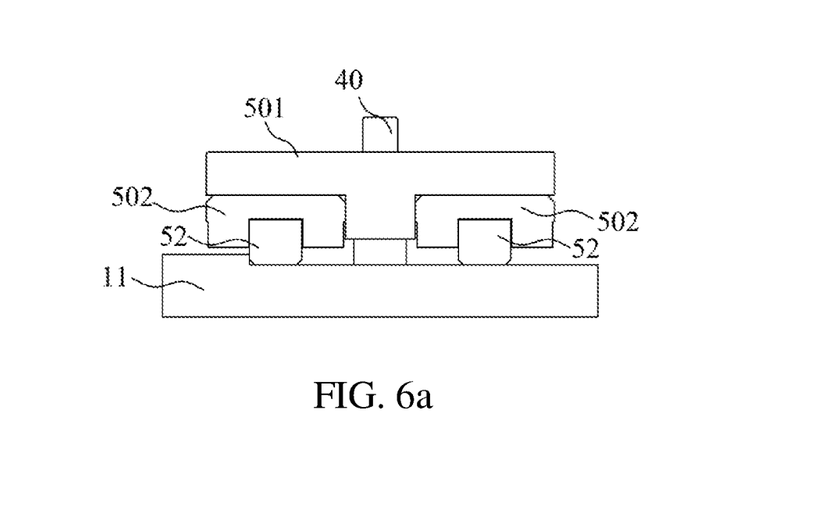
FIG. 6a is a schematic view for slide blocks of a grip jaw structure in a preferred embodiment.

Preferably, as shown in FIGS. 5c and FIG. 6a, a slide block (50) comprises a load-carrying portion (501) and two rail portions (502) such that stresses are dispersed over all divided components of a slide block for a stable and durable occlusion of a grip jaw structure.

As mentioned previously, a detailed process is shown in the following sections.

Figure 6B:
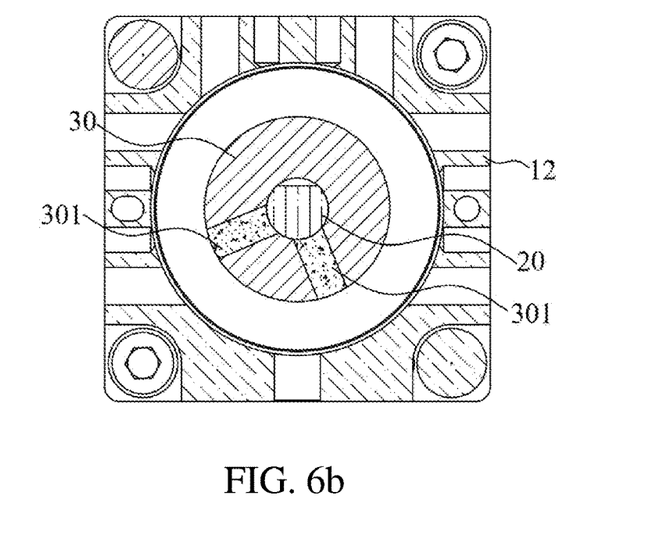
FIG. 6b is the fifth cross-sectional view of a grip jaw structure in a preferred embodiment.

Referring to FIG. 6b, which illustrates a relative position between the transmission shaft of the motor (20) and the cam disk (30) is fixed by two set screws (301) placed in lock holes on the cam disk (30). Moreover, referring to FIG. 3a, which illustrates a relationship that the cam disk (30) is driven and rotated by the rotary transmission shaft of the motor (20) fixed under the framework (10) clockwise or counterclockwise.

Referring to FIGS. 4c and 5a, which illustrate two transmission shafts (40) are accommodated inside two slotted guideways (31) of the cam disk (30) separately and each of the two transmission shafts (40) is inserted into one of a plurality of bearings (41). In practice, as shown in FIG. 4c, the slotted guideways (31) accommodate lubricants in which the transmission shafts (40) and the bearings (41) are immersed partially.

Figure 7A:
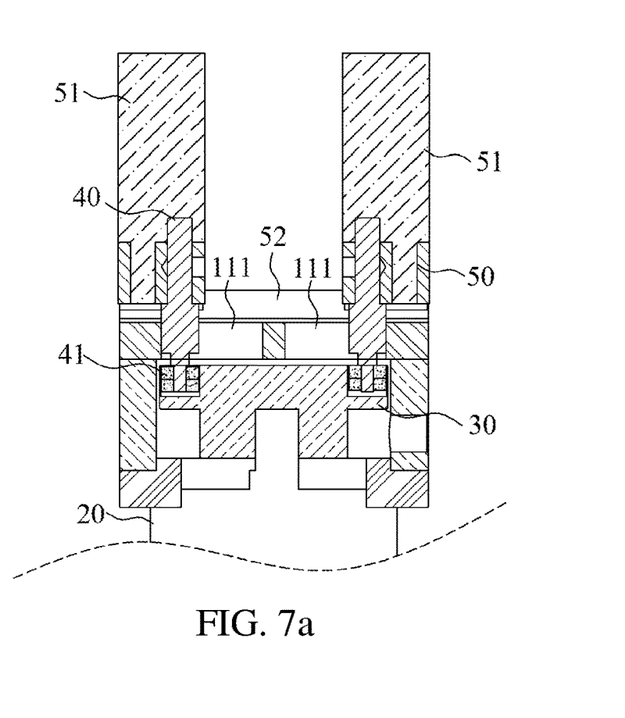
FIG. 7a is the first schematic view for operation of a grip jaw structure in a preferred embodiment.
Figure 7B:
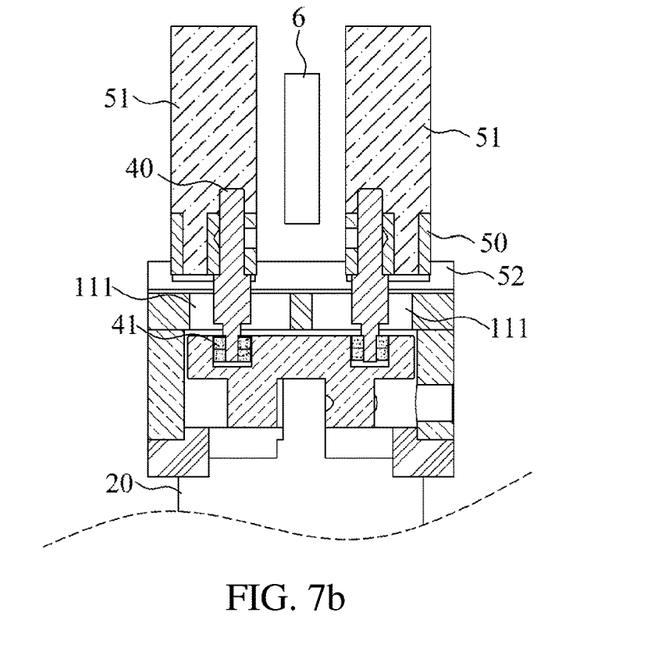
FIG. 7b is the second schematic view for operation of a grip jaw structure in a preferred embodiment.

Then, the two transmission shafts (40) in the two slotted guideways (31) are driven to be shifted by the rotary cam disk (30) such that lubricants adhere to the transmission shafts (40) and a plurality of bearings (41), both of which are being shifted, as shown from FIG. 7a to FIG. 7b.

Referring to FIG. 5b, which illustrates the thick portion (401) of the transmission shaft (40) is shifted inside the through hold portion (111) of the upper frame (11) regularly for stability of the shifted transmission shaft (40); referring to FIG. 5c, which illustrates two slide blocks (50) are driven to be shifted by the transmission shafts (40) separately along the two linear rails (52) at the top of the framework (10). In detail, as shown in FIG. 6a, the slide block (50) is driven to be shifted by the rail portions (502) fixed under the load-carrying portion (501) in which the transmission shaft (40) is inserted along the two linear rails (52) at the top of the framework (10).

Figure 7C:
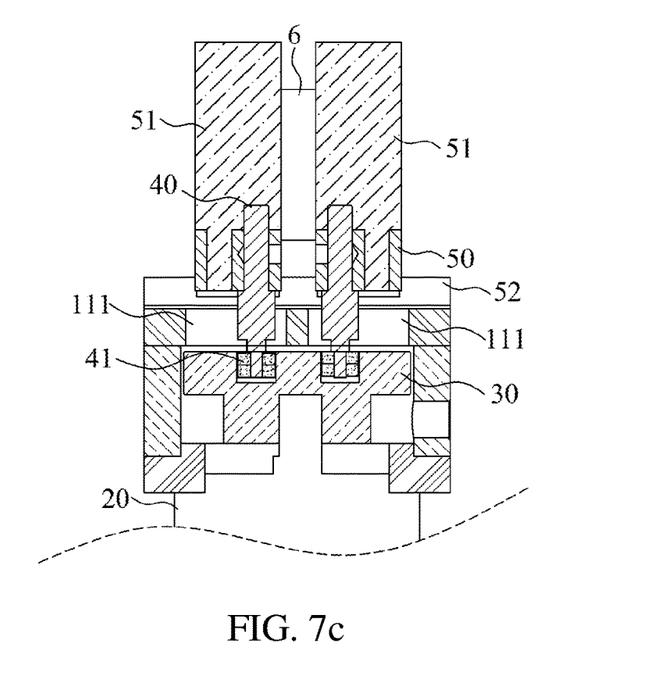
FIG. 7c is the third schematic view for operation of a grip jaw structure in a preferred embodiment.

The process to clamp a workpiece (6) by sliders (51) is shown from FIG. 7a to FIG. 7b and FIG. 7c; the workpiece (6) is clamped by the sliders (51) fixed on and driven by the two slide blocks (50) and shifted along the two linear rails (52) on the framework (10) and stresses are dispersed over all mounted components through the bearings (41).

Referring to FIG. 3c, which illustrates a grip jaw structure in the second embodiment in which the characteristics and symbols identical to those of the first embodiment in FIGS. 1, 2, 3a, 3b, 3d, 4a, 4b, 4c, 5a, 5b, 5c, 6a, 6b, 7a, 7b and 7c are not explained hereinafter. The difference in the second embodiment differing from the first embodiment is the cam disk (30) which is changed structurally.

As shown in FIG. 3c, the cam disk (30) comprises a lubricant guideway (32) linking the slotted guideways (31); the lubricant guideway (32) through which lubricants inside slotted guideways (31) communicate with each other for metal residues held in lubricants uniformly prevents the transmission shafts (40) from being worn unevenly and contributes to suppressing noise attributed to discrepancy of lubricants between slotted guideways (31).

As mentioned previously, the detailed process is shown in the following sections.

Referring to FIG. 6b, which illustrates a relative position between the transmission shaft of the motor (20) and the cam disk (30) is fixed by two set screws (301) placed in lock holes (not shown in FIG. 6b) on the cam disk (30). Referring to FIG. 3a, which illustrates a relationship that the cam disk (30) is driven and rotated by the rotary transmission shaft of the motor (20) fixed under the framework (10) clockwise or counterclockwise Referring to FIGS. 4c and 5a, which illustrate two transmission shafts (40) are accommodated inside two slotted guideways (31) of the cam disk (30) separately and each of the two transmission shafts (40) is inserted into one of a plurality of bearings (41). In practice, as shown in FIG. 4c, the slotted guideways (31) accommodates lubricants in which the transmission shafts (40) and the bearings (41) are immersed partially. Referring to FIG. 3c, which illustrates lubricants accommodated in the slotted guideways (31) uniformly through the lubricant guideway (32) prevent metal residues generated by frictions from being scattered in the slotted guideways (31) unevenly.

Then, the two transmission shafts (40) in the two slotted guideways (31) are driven to be shifted by the rotary cam disk (30) such that lubricants adhere to the transmission shafts (40) and a plurality of bearings (41), both of which are being shifted, as shown from FIG. 7a to FIG. 7b, and circulate between the slotted guideways (31) through the lubricant guideway (32) for consistent lubrication and no noise attributed to frictions induced by poor lubrication.

Referring to FIG. 5b, which illustrates the thick portion (401) of the transmission shaft (40) is shifted inside the through hold portion (111) of the upper frame (11) regularly for stability of the shifted transmission shaft (40); referring to FIG. 5c, which illustrates two slide blocks (50) are driven to be shifted by the transmission shafts (40) along the two linear rails (52) at the top of the framework (10). In detail, as shown in FIG. 6a, the slide block (50) is driven to be shifted by the rail portions (502) fixed under the load-carrying portion (501) in which the transmission shaft (40) is inserted along the two linear rails (52) at the top of the framework (10).

The process to clamp a workpiece (6) by the sliders (51) is shown from FIG. 7a to FIG. 7b and FIG. 7c; the workpiece (6) is clamped by the sliders (51) fixed on and driven by the two slide blocks (50) and shifted along the two linear rails (52) on the framework (10) and stresses are dispersed over all mounted components through the bearings (41).

As shown in previous embodiments, a grip jaw structure in which slotted guideways are integrated with a lubricant container for less space required comprises a lubricant guideway additive for better stability of a grip jaw structure operated for a long period of time. Accordingly, a grip jaw structure which is different from an ordinary gripper device and referred to as creative work in applications meets patentability and is applied for the patent.

It should be reiterated that the above descriptions present the preferred embodiments, and any equivalent changes in specifications, claims or drawings still belongs to the technical field within the present disclosure with reference to claims hereinafter.

What is claimed is:

1. A grip jaw structure comprising:
   a cam disk, which is driven by a rotary motor fixed under a framework such that two transmission shafts inside two slotted guideways of said cam disk are shifted correspondingly and lubricants in said slotted guideways adhere to and circulate in a plurality of bearings in which said transmission shafts in said slotted guideways are inserted;
   two sliders, which are fixed on two slide blocks separately and driven to be shifted by said transmission shafts along two linear rails at the top of a framework such that the bearings sustain and disperse stresses with a workpiece clamped between said sliders,
   wherein each of said transmission shafts is inserted into and rivets said bearing.

2. The grip jaw structure as claimed in claim 1 wherein the framework comprises an upper frame, a main frame and a lower frame.

3. The grip jaw structure as claimed in claim 2 wherein each of said two transmission shafts has a thick portion which is shifted in a through hold portion of said upper frame.

4. The grip jaw structure as claimed in claim 1 wherein the cam disk comprises a lubricant guideway which communicates with said slotted guideways.

5. The grip jaw structure as claimed in claim 4 wherein said lubricant guideway through which lubricants inside slotted guideways communicate with each other for metal residues held in lubricants uniformly prevents the transmission shafts from being worn unevenly and contributes to suppressing noise attributed to discrepancy of lubricants between slotted guideways.

6. The grip jaw structure as claimed in claim 4 wherein said slotted guideways in which lubricants are accommodated and both said transmission shafts and said bearings are immersed partially rely on said lubricant guideway for accommodations of lubricants inside said slotted guideway uniformly.

7. The grip jaw structure as claimed in claim 1 wherein said cam disk comprises lock holes in which two set screws are inserted such that a relative position between a transmission axis of the motor and said cam disk is fixed.

8. The grip jaw structure as claimed in claim 1 wherein each of said two transmission shafts has a thin portion inserted in one of the bearings.

9. The grip jaw structure as claimed in claim 1 wherein each of said two slide blocks comprises a load-carrying portion and two rail portions.

* * * * *